(12) United States Patent
Henkel et al.

(10) Patent No.: US 11,890,950 B2
(45) Date of Patent: Feb. 6, 2024

(54) SYSTEM HAVING AN ELECTRIC CONSUMER

(71) Applicant: SEW-EURODRIVE GMBH & CO. KG, Bruchsal (DE)

(72) Inventors: Rico Henkel, Oberhausen-Rheinhausen (DE); Martin Bund, Karlsruhe (DE); Mario Epp, Bammental (DE); Stefan Hien, Speyer (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 303 days.

(21) Appl. No.: 17/298,155

(22) PCT Filed: Oct. 24, 2019

(86) PCT No.: PCT/EP2019/025363
§ 371 (c)(1),
(2) Date: May 28, 2021

(87) PCT Pub. No.: WO2020/108795
PCT Pub. Date: Jun. 4, 2020

(65) Prior Publication Data
US 2021/0394620 A1  Dec. 23, 2021

(30) Foreign Application Priority Data
Nov. 29, 2018 (DE) .......................... 102018009349.3

(51) Int. Cl.
*B60L 5/36* (2006.01)
*H02H 7/08* (2006.01)
(Continued)

(52) U.S. Cl.
CPC ................. *B60L 5/36* (2013.01); *B60M 3/04* (2013.01); *H02H 7/08* (2013.01); *H02P 27/06* (2013.01)

(58) Field of Classification Search
CPC .. B60L 5/36; H02P 27/06; B60M 3/04; H02H 7/08
See application file for complete search history.

(56) References Cited

U.S. PATENT DOCUMENTS

| 10,035,660 B2 | 7/2018 | Zoeller | |
| 2010/0079093 A1* | 4/2010 | Kitanaka | B60L 3/04 318/400.3 |
| 2017/0260007 A1* | 9/2017 | Zoeller | B61B 3/02 |

FOREIGN PATENT DOCUMENTS

| DE | 102014013500 A1 * | 3/2016 | ............... B61B 3/02 |
| DE | 102014013500 A1 | 3/2016 | |

(Continued)

OTHER PUBLICATIONS

International Search Report issued in corresponding International Application No. PCT/EP2019/025363, dated Feb. 21, 2020, pp. 1-2, English Translation.

*Primary Examiner* — Zoheb S Imtiaz
(74) *Attorney, Agent, or Firm* — CARTER, DELUCA & FARRELL LLP

(57) ABSTRACT

A system having electric consumers includes an electrical device including an operating device and wires supplying the consumer. A first wire is provided for conducting the first phase of a three-phase voltage during a normal operation, a second wire conducts a second phase of the three-phase voltage, and a third wire conducts a third phase of the three-phase voltage. The consumer is able to be supplied with the three-phase voltage from the wires during a normal operation. The operating device is configured so that: in a normal operation, the first wire is connected to the first phase of the three-phase voltage; and in a safety case, the first wire is separated from the first phase of the three-phase voltage and will be or is connected to the second phase of the three-phase voltage.

30 Claims, 2 Drawing Sheets

(51) Int. Cl.
*B60M 3/04* (2006.01)
*H02P 27/06* (2006.01)

(56) References Cited

FOREIGN PATENT DOCUMENTS

| | | | |
|---|---|---|---|
| DE | 102017008381 A1 * | 3/2018 | |
| DE | 102017008381 A1 | 3/2018 | |
| EP | 2773001 A1 * | 9/2014 | ............. H02H 3/16 |
| EP | 2773001 A1 | 9/2014 | |
| WO | 2018086820 A1 | 5/2018 | |

* cited by examiner

SYSTEM HAVING AN ELECTRIC CONSUMER

FIELD OF THE INVENTION

The present invention relates to a system having an electric consumer.

BACKGROUND INFORMATION

Certain conventional rail vehicles can be electrically supplied with the aid of collector wires.

German Patent Document No. 10 2014 013 500 describes a conveyor system having a safety function.

SUMMARY

Example embodiments of the present invention improve the safety in a system having electric consumers in an uncomplicated manner.

According to an example embodiment of the present invention, a system includes electric consumers, e.g., with a drive and/or an electric motor supplied by an inverter. The system has an electrical device including an operating device and wires, e.g., collector wires. A first one of the wires is provided for conducting the first phase of a three-phase voltage during a normal operation, a second one of the wires conducts a second phase of the three-phase voltage, a third one of the wires conducts a third phase of the three-phase voltage. The consumer is able to be supplied with a three-phase voltage from the wires during a normal operation, and the operating device is configured so that: during a normal operation, the first wire is connected to the first phase of the three-phase voltage; and in a safety case, the first wire is separated from the first phase of the three-phase voltage and will be or is connected to the second phase of the three-phase voltage.

This offers the advantage that a current supply for the signal electronics of the consumer is supplied also in a safety case. This is because only one of the three phases of the three-phase voltage supply is separated in a safety case and the wire provided for this phase during a normal operation is connected to one of the other wires. In this manner, the power supply for the consumer is reduced. In addition, the mobile part is no longer supplied with a three-phase voltage.

According to an example embodiment of the present invention, a rail system includes rail sections and a mobile part. A respective rail section has an electrical device including an operating device, a rail and collector wires, which are situated in parallel thereto. A first one of the collector wires is provided for conducting the first phase of a three-phase voltage during a normal operation, a second one of the collector wires conducts a second phase of the three-phase voltage, and a third one of the collector wires conducts a third phase of the three-phase voltage. The mobile part has sliding collectors so that a drive, e.g., an electric motor fed by an inverter, of the mobile part is able to be supplied with a three-phase voltage from the collector wires during a normal operation. The operating device is configured such that: in a normal operation, the first collector wire is connected to the first phase of the three-phase voltage; and in a safety case, the first collector wire is separated from the first phase of the three-phase voltage and will be or is connected to the second phase of the three-phase voltage.

This has the advantage that a current supply for the signal electronics of the mobile part is available also in a safety case. This is because only one of the three phases of the three-phase voltage is separated and the collector wire, which is provided for this phase in a normal operation, is connected to another one of the collector wires. This reduces the power supply for the drive of the mobile part. In addition, no three-phase voltage is supplied to the mobile part any longer. Therefore, a three-phase motor of the mobile part functioning as a drive and being directly supplied with the three-phase voltage would no longer generate torque in a safety case because the stator of this three-phase motor could also no longer supply a rotating field to the rotor. However, if the three-phase motor is supplied via an inverter which is supplied from the three-phase voltage in a normal operation, a slight torque would still be supplyable in the safety case. However, an enable signal is taken away by a safety relay of the mobile part in a safety case, e.g., blocked, and a switch-off signal is thus transmitted to the signal electronics of the inverter so that the power electronics of the inverter will then also be switched off, which means that the inverter no longer supplies a three-phase voltage to the motor.

The safety is increased as a result. A safety case is therefore induced when an emergency switch is operated, and a deactivation of the drive of the mobile part takes place.

In addition, the drive is able to be equipped with an electromagnetically operable brake, which is applied in a safety case because the current supply of a coil of the brake is switched off and/or is unavailable because the coil of the brake is supplied from the voltage that is present between the first and the second wire contact conductors and assumes a vanishing value in a safety case.

According to example embodiments, the operating device has two contactors which include changeover contacts that are switched in series, the control coils of the two contactors, e.g., being switched in parallel. The changeover contact of the second contactor, for example, connects either the first phase or the second phase of the three-phase voltage to an electrical wire, and the changeover contact of the first contactor connects either the second phase or this electrical wire to the first collector wire. This offers the advantage that the electrical connection of the first contact conductor to the second phase of the three-phase voltage is possible only when both changeover contacts are operated. If only one of the changeover contacts is operated, then the first collector wire is without current. When the first collector wire is connected to the second collector wire with the aid of a resistor, then in the mentioned case of the currentlessness of the first collector wire, its potential is lowered toward the second phase. The resistance is, e.g., smaller than half of the ohmic resistance of the control coil of the third contactor.

According to example embodiments, the mobile part has a control including a safety relay, and the control having the safety relay is supplied by a rectifier, which is supplied from the voltage present between the second and third collector wire, e.g., from the voltage present between the second phase and the third phase. This offers the advantage that the mobile part is able to be automatically driven in the system and the safety is increased.

According to example embodiments, an isolation block is situated between the respective first collector wires of the rail sections, which, for example, is supplied with voltage by a monitoring unit only if the voltages detected by the monitoring unit at the respective first collector wires have effective values and/or peak values that are similar to one another in their magnitudes. This is considered advantageous insofar as each rail section is able to have a separate feed line. This means that the three-phase voltage from the public alternating voltage supply network can be separately supplied to each rail section. Overloading of one of the feed lines is therefore avoidable.

According to example embodiments, the safety case is able to be triggered by operating a stationary emergency switch, e.g., an emergency switch implemented as a light barrier or as a pressure mat, which specifically means that the normal operation is able to be terminated by operating a stationary emergency switch, and that a transition to the safety case takes place. This offers the advantage that the safety case is readily triggered, but the signal electronics is supplied nevertheless. Only the power supply for the drive is reduced so that the drive does not generate torque.

According to example embodiments, the three-phase voltage is supplied from the public supply network. This is considered advantageous insofar as a three-phase voltage is transmittable with the aid of the collector wires and the sliding collectors on the mobile part and a three-phase motor can thus be supplied so that it may be set into a rotary motion and torque be built up.

According to example embodiments, the mobile part has at least one sliding collector for each collector wire, the respective sliding collector touching the respective collector wire. This offers the advantage of allowing for a direct transmission of the three-phase voltage, which especially means that no converter has to be interconnected.

According to example embodiments, the mobile part has a third and a fourth contactor, whose control coils are switched in parallel and/or are supplied from the voltage present between the first collector wire and the second collector wire. A release signal, e.g., a safety-directed STO signal, is able to be generated with the aid of the contacts of the contactors and/or made available to the drive, e.g., the electric motor fed by an inverter or a converter. This is considered advantageous insofar as greater safety is provided because the reduction of the power supply, i.e., the short-circuiting or the electrical connection of the first collector wire to the second collector wire, causes an activation of the third and fourth contactor and an STO signal is thereby transmittable to the drive of the mobile part.

According to example embodiments, a dataflow is modulated between the second and the third collector wire so that a data transmission from the stationary part of the rail system is able to take place also in a safety case, e.g., from the electrical device or a central control of the rail system connected to the electrical device. This has the advantage that greater safety is achievable because in a safety case the switch-off information is additionally transmittable to the mobile part by the dataflow. On the one hand, the power supply in the safety case is reduced by short-circuiting and/or interconnecting the first and the second collector wires, and a switch-off command is transmitted via the dataflow on the other hand. Greater safety is therefore achieved, e.g., also because physically different media are used for the redundant switch-off.

According to example embodiments, the first collector wire is connected to ground or to the second collector wire with the aid of a resistor, the resistance, e.g., being less than half of the ohmic resistance of the control coil of the third contactor, and the third contactor and the fourth contactor, e.g., have an identical development. This offers the advantage that despite the control coils of the third and fourth contactors, which are supplied from the voltage present between the first and the second collector wire, the voltage is pulled down to the electric ground or to the second collector wire by the resistance.

Further features and aspects of example embodiments of the present invention are described in greater detail below with reference to the appended schematic Figures.

DETAILED DESCRIPTION

Figure 1:
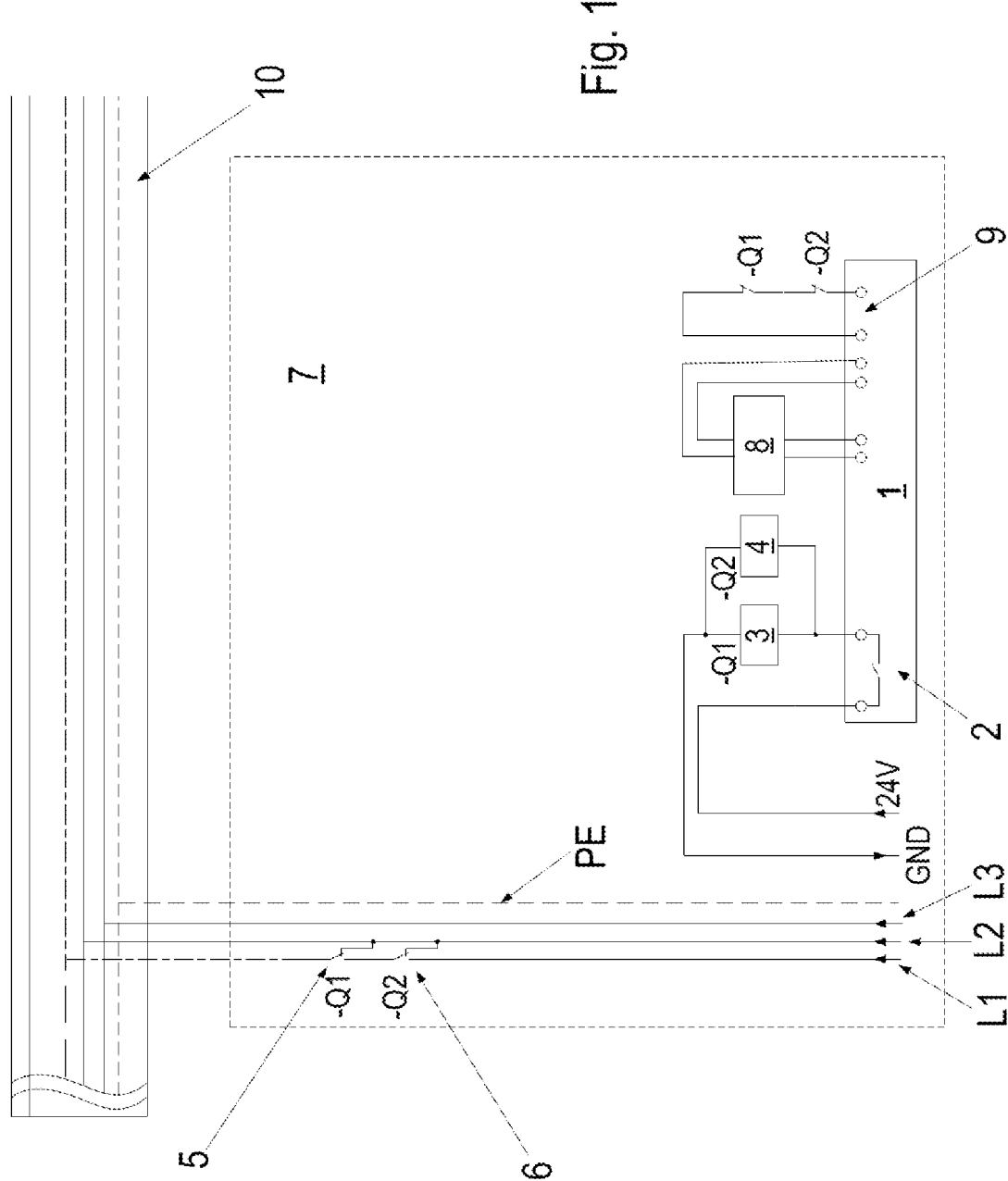
FIG. 1 schematically illustrates a first part of a rail system according to an example embodiment of the present invention.
Figure 2:
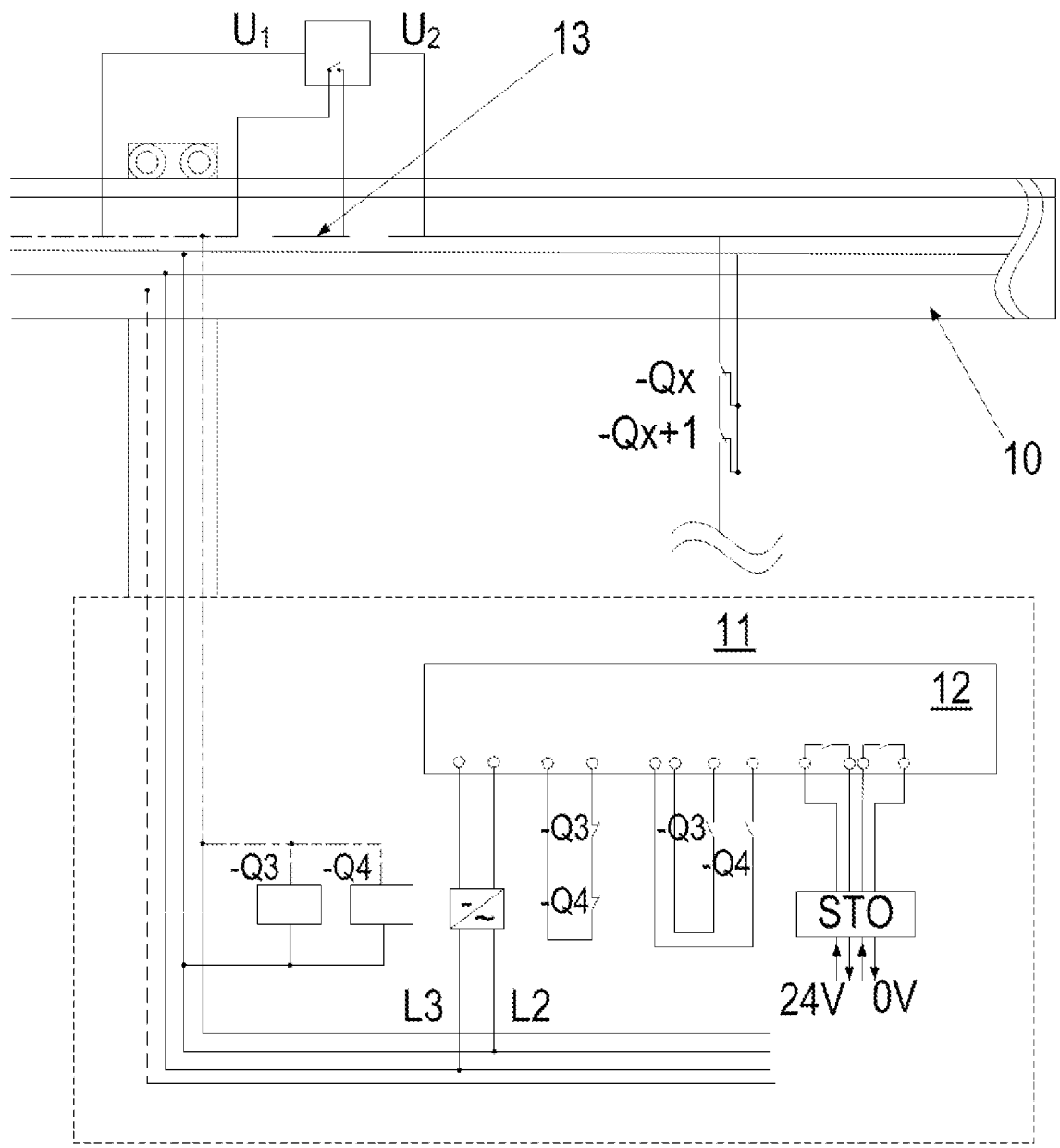
FIG. 2 schematically illustrates a second part of a rail system according to an example embodiment of the present invention.

FIG. 1 schematically illustrates a first part and FIG. 2 schematically illustrates a second part of a rail system according to an example embodiment of the present invention, which includes rail sections that are delimited from one another via isolation blocks 13.

Situated in a first one of these rail sections is a stationary electrical device 7, a rail 10 having collector wires and a mobile part 11, e.g., in particular a rail vehicle.

As illustrated in FIG. 1, the rail section of the rail system has a rail 10 and collector wires extend in parallel with rail 10.

As illustrated in FIG. 1, a mobile part 11 is movable along the rail and has sliding collectors so that the electric power supplied via the collector wires is able to be conveyed to an electric motor used as a drive.

Three phases of a three-phase voltage are thereby supplied to mobile part 11 via the collector wires. For that reason, at least three collector wires are provided, that is to say, the three phases L1, L2, L3.

The wheels of mobile part 11 roll on the rail so that the mobile part 11 is guided by the rail and is therefore able to move to and from.

Mobile part 11 has a control which is supplied by a direct voltage, e.g., 24 Volt. The control controls the electric motor. As also in the case of the control, safety relay 12 illustrated in FIG. 2 is likewise supplied from the direct voltage, which is provided by a rectifier whose AC-voltage-side connection is supplyable by two phases L2, L3 of the three-phase voltage. Thus, the control is not supplied from all three phases L1 and L2 and L3 but only from two phases L2, L3.

According to example embodiments of the present invention, stationary electrical device 7 has an operating device for separating the collector wire provided for conducting first phase L1, hereinafter also referred to as the first collector wire, from first phase L1 and to connect it to second phase L2 of the three-phase voltage.

In mobile part 11, the control coils of a third and a fourth contactor Q3, Q4 are fed from the collector wire provided for first phase L1 and from the collector wire provided for second phase L2.

However, as soon as the safety case occurs, which is illustrated in FIG. 1, that is to say, when stationary emergency switch 2 is operated and control coil 3 of a first contactor Q1 and control coil 4 of a second contactor Q2 become currentless, the collector wire provided for conducting first phase L1 is separated from first phase L1 of the three-phase voltage and instead is connected to second phase L2 of the three-phase voltage.

However, as illustrated in FIG. 2, this has the result that on mobile part 11 the control coil of third contactor 3 and the control coil of fourth contactor Q4 are no longer supplied and conductors Q3 and Q4 open. This is transmitted to the rest of the control as an STO signal so that the electric motor of mobile part 11 is brought into a safe state, i.e., is switched off, for example.

In addition, because first phase L1 for mobile part 11 is no longer available, the input voltage of the drive system is reduced and thus the power supply as well. For this reason alone, the electric motor is already no longer able to supply the full drive power, i.e., only generates a torque that is insufficient for driving mobile part 11.

A safe deactivation of the drive of mobile part 11 is therefore achieved in a safety case.

The control coils of first contactor Q1 and second contactor Q2 are switched in parallel. The changeover contact of first contactor Q1 and the changeover contact of second contactor Q2 are connected to each other in series. This ensures that the collector wire provided to conduct first phase L1 during a normal operation is connected to second phase L2 only during the changeover of both changeover contacts of the two contactors Q1 and Q2, that is to say, in a safety case.

If only one of the two changeover contacts of the two contactors Q1 or Q2 is operated, the collector wire provided for conducting first phase L1 during a normal operation remains currentless.

If none of the two changeover contacts of the two contactors Q1 or Q2 is operated, then the collector wire provided for conducting first phase L1 remains connected to first phase L1.

As illustrated in FIG. 2, isolation blocks 13 are placed between the rail sections for the electric isolation. Each one of the rail sections of the rail system has a stationary electrical device 7 of the previously described type, which means that an operation of the individual emergency switch there, i.e., in a security case, the collector wire provided for conducting first phase L1 is connected to second phase L2 in each rail section.

With the aid of an isolation block 13, this collector wire is separated from the collector wire provided for conducting first phase L1 during a normal operation. A monitoring unit detects the voltages of the collector wire of the respective rail section adjacent to isolation block 13 provided for conducting first phase L1 during a normal operation and electrically connects isolation block 13 to one of the collector wires only as long as the acquired voltages have peak values and/or effective values that are similar to one another in their magnitudes. In all other cases, the isolation block remains currentless so that mobile part 11 is stopped when it travels over isolation block 13.

The safety is improved as a result.

In a normal operation, mobile part 11 is capable of traveling through the entire rail system, i.e., along all rail sections.

In further exemplary embodiments according to the present invention, second phase L2 or the third phase is used instead of first phase L1, or in other words, the phases are permutated.

LIST OF REFERENCE CHARACTERS

1 safety relay
2 emergency switch
3 control coil of first contactor Q1
4 control coil of second contactor Q2
5 changeover contact of first contactor Q1
6 changeover contact of second contactor Q2
7 stationary electrical device
8 emergency shut-off switch
9 auto-start
10 rail having collector wires
11 mobile part, in particular rail vehicle
12 safety relay
13 isolation block
Q1 first contactor
Q2 second contactor
Q3 third contactor
Q4 fourth contactor
L1 first phase of the three-phase voltage
L2 second phase of the three-phase voltage
L3 third phase of the three-phase voltage
GND electric ground

The invention claimed is:

1. A system, comprising:
an electric consumer; and
an electrical device including an operating device and wires adapted to supply the consumer, a first one of the wires adapted to conduct a first phase of a three-phase voltage during a normal operation, a second one of the wires adapted to conduct a second phase of the three-phase voltage, a third one of the wires adapted to conduct a third phase of the three-phase voltage, the wires adapted to supply the consumer with the three-phase voltage during the normal operation;
wherein the operating device is adapted to connect the first wire to the first phase of the three-phase voltage during the normal operation, and to separate the first wire from the first phase of the three-phase voltage and to connect the first wire to the second phase of the three-phase voltage in a safety case.

2. The system according to claim 1, wherein the electric consumer includes a drive and/or an electric motor supplied by an inverter.

3. The system according to claim 1, wherein the wires are arranged as collector wires.

4. The system according to claim 1, wherein the operating device includes two contactors that include changeover contacts switchable in series.

5. The system according to claim 4, wherein control coils of the two contactors are switchable in parallel.

6. The system according to claim 4, wherein a changeover contact of a second contactor connects the first phase or the second phase of the three-phase voltage to an electrical wire, and the changeover contact of a first contactor connects the second phase or the electrical wire to the first wire.

7. The system according to claim 1, wherein the consumer includes a control which having a safety relay, and the control is adapted to be supplied by a rectifier supplied from a voltage present between the second wire and the third wire.

8. The system according to claim 7, wherein the consumer is arranged as a mobile part.

9. The system according to claim 1, wherein a stationary emergency switch is adapted to trigger the safety case, to terminate the normal operation, and to transition from the normal operation to the safety case.

10. The system according to claim 9, the emergency switch includes a pressure mat, a light barrier, and/or a light-barrier system having a light grating.

11. The system according to claim 1, wherein the three-phase voltage is supplied from a public supply network and/or a public alternating voltage supply network.

12. The system according to claim 1, wherein the consumer is arranged as a mobile part that includes at least one sliding collector for each one of the wires, each sliding collector touching a respective wire.

13. The system according to claim 4, wherein the consumer is arranged as a mobile part that includes a third contactor and a fourth contactor having control coils switched in parallel and/or supplied from a voltage present between the first wire and the second wire, at least one contactor being adapted to generate and/or make available to a drive a release signal, and/or a safety-directed STO signal.

14. The system according to claim 13, wherein the first wire is connected to the second wire or to an electrical ground via a resistor having a resistance that is less than half of an ohmic resistance of the control coil of the third contactor, the third contactor and the fourth contactor having an identical configuration.

15. A rail system, comprising:
rail sections; and
a mobile part:
wherein each rail section includes an electrical device including an operating device, a rail, and collector wires connected in parallel thereto, a first one of the collector wires adapted to conduct a first phase of a three-phase voltage during a normal operation, a second one of the collector wires adapted to conduct a second phase of the three-phase voltage, a third one of the collector wires adapted to conduct a third phase of the three-phase voltage, the mobile part including sliding collectors so that a drive of the mobile part is suppliable with the three-phase voltage from the collector wires during the normal operation;
wherein the operating device is adapted to connect the first conductor wire to the first phase of the three-phase voltage during the normal operation, and to separate the first collector wire from the first phase of the three-phase voltage and connect the first collector wire to the second phase of the three-phase voltage in a safety case.

16. The rail system according to claim 15, wherein the drive includes an electric motor fed by an inverter.

17. The rail system according to claim 15, wherein the wires are arranged as collector wires.

18. The rail system according to claim 15, wherein the operating device includes two contactors that include changeover contacts switchable in series.

19. The rail system according to claim 18, wherein control coils of the two contactors are switchable in parallel.

20. The rail system according to claim 18, wherein a changeover contact of a second contactor connects the first phase or the second phase of the three-phase voltage to an electrical wire, and the changeover contact of a first contactor connects the second phase or the electrical wire to the first wire.

21. The rail system according to claim 15, wherein the consumer includes a control which having a safety relay, and the control is adapted to be supplied by a rectifier supplied from a voltage present between the second wire and the third wire.

22. The rail system according to claim 21, wherein the consumer is arranged as a mobile part.

23. The rail system according to claim 15, wherein an isolation block is arranged between the first collector wires of the rail sections, a monitor unit adapted to supply the isolation block with voltage only if voltages detected by the monitoring unit at the first collector wires have peak values and/or effective values that are similar to one another in magnitude.

24. The rail system according to claim 15, wherein a stationary emergency switch is adapted to trigger the safety case, to terminate the normal operation, and to transition from the normal operation to the safety case.

25. The rail system according to claim 24, the emergency switch includes a pressure mat, a light barrier, and/or a light-barrier system having a light grating.

26. The rail system according to claim 15, wherein the three-phase voltage is supplied from a public supply network and/or a public alternating voltage supply network.

27. The rail system according to claim 15, wherein the consumer is arranged as a mobile part that includes at least one sliding collector for each one of the wires, each sliding collector touching a respective wire.

28. The rail system according to claim 18, wherein the consumer is arranged as a mobile part that includes a third contactor and a fourth contactor having control coils switched in parallel and/or supplied from a voltage present between the first wire and the second wire, at least one contactor being adapted to generate and/or make available to a drive a release signal, and/or a safety-directed STO signal.

29. The rail system according to claim 15, wherein a dataflow is modulated between the second collector wire and the third collector wire, so that a data transmission from a stationary part of the rail system is able to take place in the safety case from the electrical device or a central control of the rail system connected to the electrical device.

30. The rail system according to claim 28, wherein the first wire is connected to the second wire or to an electrical ground via a resistor having a resistance that is less than half of an ohmic resistance of the control coil of the third contactor, the third contactor and the fourth contactor having an identical configuration.

* * * * *